R. GONZALEZ.
BOILER DIAGRAMMING APPARATUS.
APPLICATION FILED JULY 6, 1920.

1,403,156.

Patented Jan. 10, 1922.
5 SHEETS—SHEET 1.

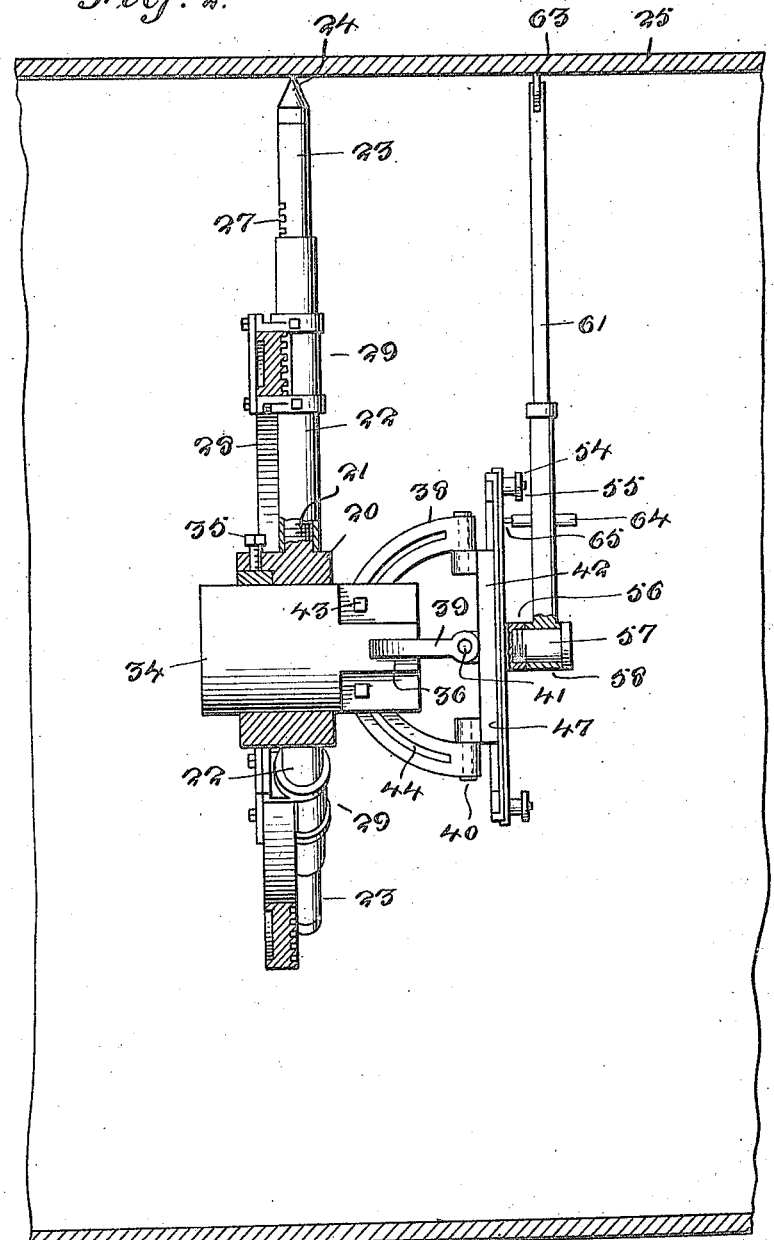

R. GONZALEZ.
BOILER DIAGRAMMING APPARATUS.
APPLICATION FILED JULY 6, 1920.
1,403,156.
Patented Jan. 10, 1922.
5 SHEETS—SHEET 3.
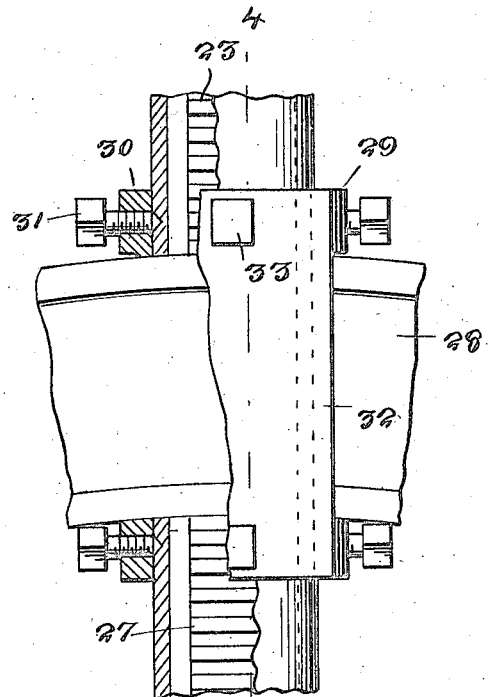
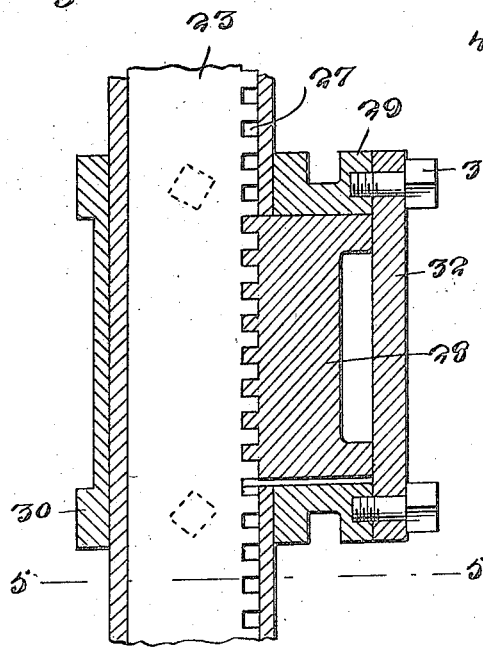
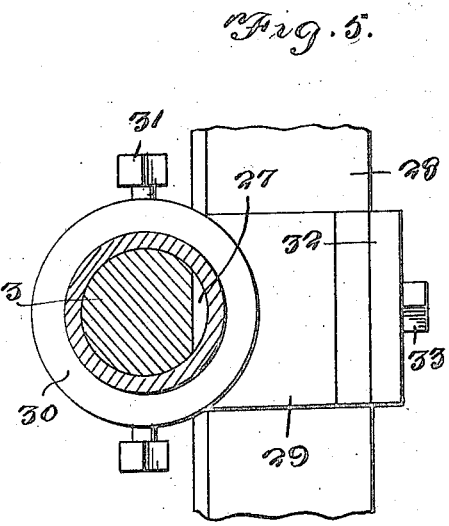
R. Gonzalez
INVENTOR
BY Victor J. Evans
ATTORNEY

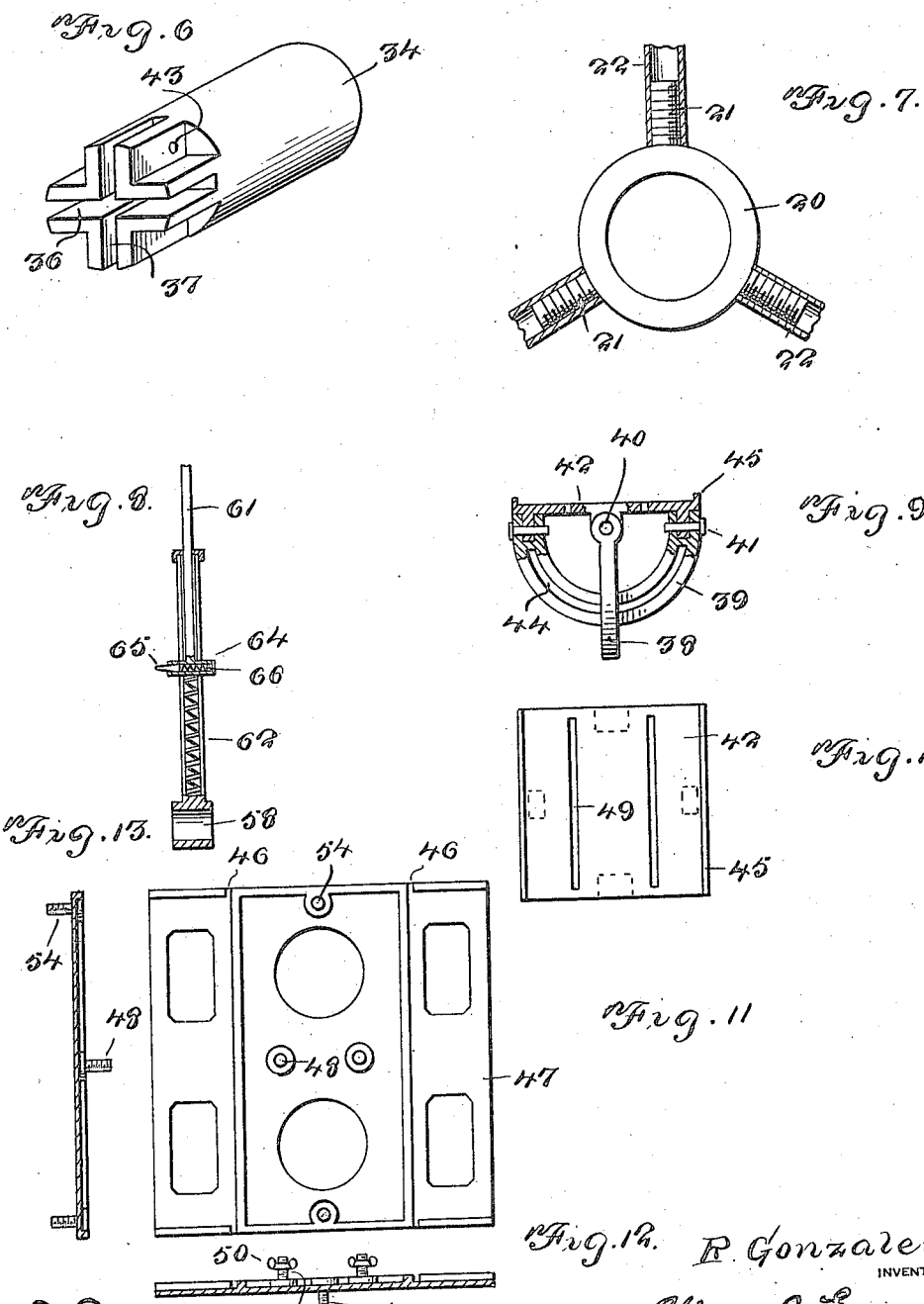

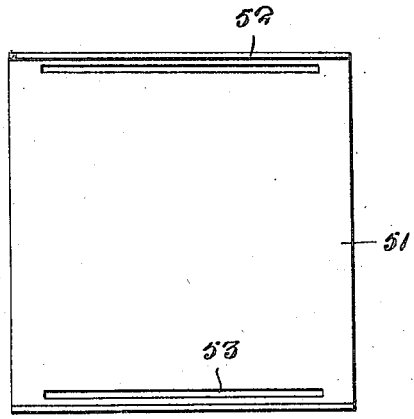
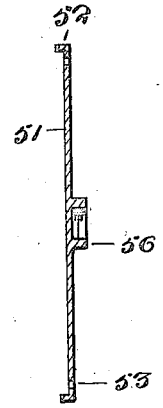
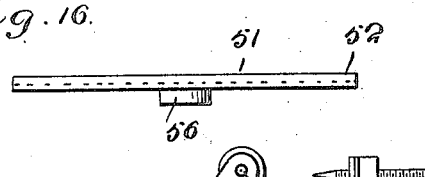
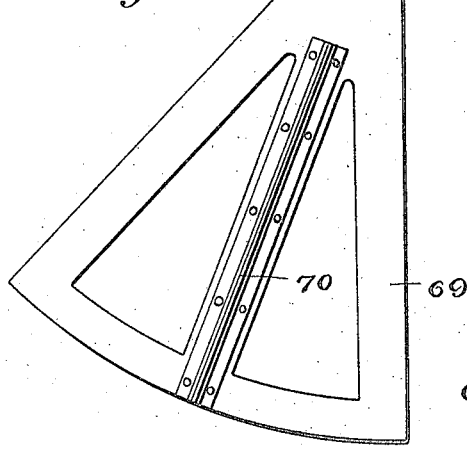
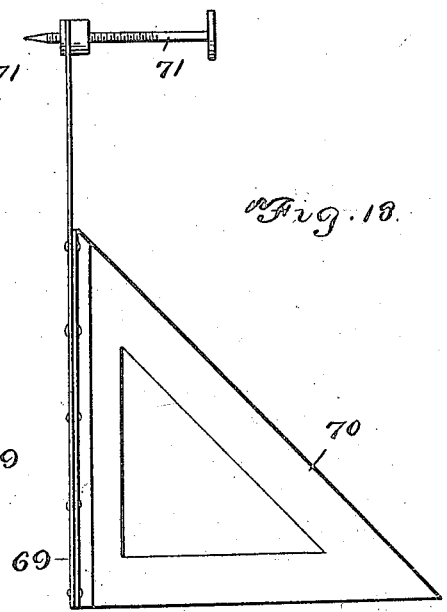

UNITED STATES PATENT OFFICE.

RAMON GONZALEZ, OF MANILA, PHILIPPINE ISLANDS.

BOILER-DIAGRAMMING APPARATUS.

1,403,156. Specification of Letters Patent. Patented Jan. 10, 1922.

Application filed July 6, 1920. Serial No. 394,324.

*To all whom it may concern:*

Be it known that I, RAMON GONZALEZ, a citizen of the United States, residing at Manila, Philippine Islands, have invented new and useful Improvements in Boiler-Diagramming Apparatus, of which the following is a specification.

The object of the invention is to provide an efficient means whereby a boiler may be diagrammed and plotted with accuracy so as to give the dimensions thereof with reference to a plotting sheet especially adapted for the purpose, the apparatus being such as to provide for properly centering and positioning the plotting cable or board by which the graduated or plotting sheet is held in place, while the diagram of the interior surface of the boiler is indicated thereon as a means of determining the shape, dimensions, capacity and the like and as a guide in connection with the repairing and replacing of boilers.

With these and related objects in view the invention consists in a construction and combination of parts of which a preferred embodiment is shown in the drawings, it being understood that changes in form, proportion and details may be resorted to, within the scope of the appended claims without departing from the principles involved.

In the drawing:

Figure 2 is a side view partly in section of the same.

Figure 3 is a rear view of a portion of the means whereby the arms of the spider constituting the supporting member of the apparatus are adjusted for terminal contact with the inner surface of the wall of the boiler.

Figure 1:
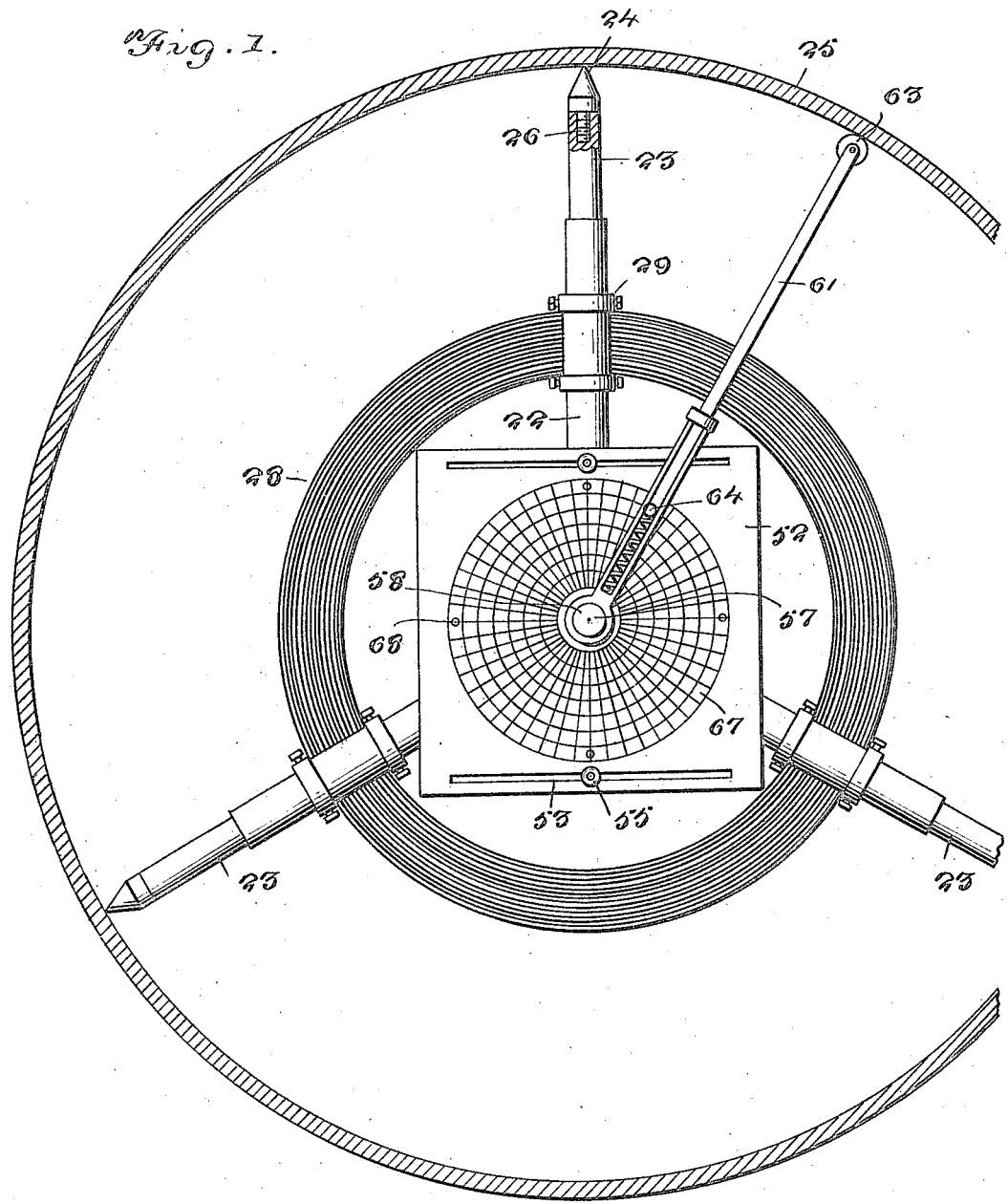
Figure 1 is a front view of a diagramming or plotting apparatus constructed in accordance with the invention, applied in the operative position to a boiler.

Figures 4 and 5 are detail sectional views respectively on the planes indicated by the lines 4—4 and 5—5 of Figure 3.

Figure 6 is a detail view of the center post which is supported by the base of the spider.

Figure 7 is a similar view of the base of the spider.

Figure 8 is a detail sectional view of the inner end of the tracing arm to show the means whereby its outer end is held in contact with the inner surface of the wall of the boiler during the tracing of the diagram.

Figure 9 is a detail view of the supporting plate and its connected segments by which it is mounted upon the center post in a plane accurately perpendicular to the axis of the boiler.

Figure 10 is a plan view of the supporting plate.

Figures 11, 12 and 13 are respectively plan and edge views of the intermediate plate which is mounted upon the supporting plate.

Figures 14, 15, and 16 are respectively plan and edge views of the plotting table or board which is mounted upon the intermediate plate for supporting the scribing or tracing arm and which is adapted for arrangement both in accurate perpendicularity to the axis of the boiler and with its center coinciding with said axis to support the plotting sheet in proper position to receive the diagram produced by the tracing arm.

Figures 17 and 18 are respectively face and side views of a trial or adjusting tool which is used in connection with the apparatus to determine the accurately centered position of the plotting table or board, said tool being shown in operative position in the boiler as seen when in use.

The apparatus consists essentially of a supporting member adapted for arrangement in a boiler and embodying means for approximately locating its center in coincidence with the center of the boiler measured transversely or diametrically thereof, a plotting table or board and means in connection therewith for arranging said table or board with its center in coincidence with the axis of the boiler and perpendicular to the plane thereof, and a tracing arm mounted upon the plotting table or board and adapted to permanently follow the contour of the inner surface of the boiler wall to inscribe upon the surface of a plotting sheet supported by said table or board a true and accurate diagram of said inner surface of the boiler with reference to dimension lines and graduations represented upon the said sheet. In the illustrated embodiment of the invention the supporting member consists of a spider having an annular center or base 20 from which radiate studs 21 upon which are fitted the inner ends of tubes 22 in which slidingly operate extension rods 23 carrying bearing points 24. These bearing points are reduced for contact with the inner surface of the boiler wall indicated at 25 and are provided with threaded shanks 26 fitting in sockets in the ends of the extension rods, so that independent adjustment of the point may be secured when necessary. The extension rods are fitted to slide in radial directions in the tubes 22 and are provided with racks 27 for engagement by the threads of an annular screw plate 28 mounted for rotary movement in bearing boxes 29 supported by sleeves 30 which are secured to the tubes 22 by means of set screws 31. Said guides or bearing boxes 29 are provided with cap plates 32 held in place adjustably by cap screws 33 by which lost motion between the adjusting screw plate and the rack on the tension rods may be taken up. Obviously by turning the screw plate or ring the extension arms may be adjusted outwardly or inwardly simultaneously until the bearing point at the extremities thereof come into contact with the inner surface of the wall of the boiler and in the event of a decided irregularity in the wall, one or more of the said points can be independently adjusted to secure a satisfactory and firm bearing which will support the annular base 20 in a substantial manner and approximately in coincidence with the axial center of the boiler.

Removably fitted in the base 20 is a center post 34 held in place by said set screws 35 and provided at its forward end with intersecting bearing slots 36 and 37 shown clearly in Figure 6, for the reception respectively of the segments 38 and 39 which are pivotally mounted respectively at 40 and 41 upon a supporting plate 42. Obviously by reason of these segments and pivotal connection with the supporting plate, said segments being adjustable in the seats formed by the slots 36 and 37, any desired angular adjustment of the supporting plate 42 with reference to the axial center of the boiler may be secured, so that perpendicularity of the plane of said plate with the axis of the boiler may be secured, and the segments are then locked in position by means of set screws 43 carried by the center post and terminally engaging grooves 44 formed in the side surfaces of said segments.

The supporting plate 42 is provided at opposite sides with perpendicular outstanding flanges 45 for engagement with grooves 46 formed in the rear surface of an intermediate plate 47 which bears upon the supporting plate and carries set screws 48 operating in slots 49 in the supporting plate and engaged at the rear surface of the latter by thumb nuts 50, so that said intermediate plate may be adjusted in a direction parallel with the guides formed by the flanges 45 and slots or grooves 46 and then locked by tightening said thumb nuts 50.

The plotting table or board 51 is provided with rearwardly extending flanges 52 for engagement with opposite edges of the intermediate plate and with slots 53 parallel with the flanges for receiving set screws 54 projecting forwardly from the intermediate plate and fitted with thumb nuts 55, said plotting board or table thus being adjustable in a direction parallel with said flanges 52 and slots 53 which are located in planes and extend in directions at right angles to the path of adjustment of the intermediate plate with reference to the supporting plate, to accurately position the center of the plotting board in coincidence with the axis of the boiler. In other words, by reason of the universal adjustment of the plotting board or plate with reference to the supporting plate, due to the right angularly positioned guide connecting the intermediate plate with the supporting plate and the plotting board with the intermediate plate, the center of the plotting board may be arranged accurately in the center of the boiler, and by reason of the universal adjustment of the supporting plate angularly with reference to the line of the axis of the boiler, the plane of said plotting board or table can be arranged in accurate perpendicularity to the axis of the boiler. At its center the plotting board or table carries a thimble 56 which is interiorly threaded to receive a bearing pin 57 upon which is mounted the eye 58 at the inner end of a tracing or plotting arm 59.

Said tracing arm consists of an inner tubular member 60 which carries the bearing eye 58, and an outer movable member 61 which is mounted to slide in said tubular member and yieldingly held extended by a spring 62, the outer end of said tracing arm being provided with a guide roller 63 for tranversing the inner surface of the boiler wall while at its inner end said extension member 61 carries a transverse pencil tube 64 in which is arranged a pencil 65 held advanced yieldingly by a spring 66. In Figure 1 a plotting sheet 67 is shown upon the plotting table or board, engaged with retaining pins 68 which are provided upon the surface of the board to engage the set sheet and thus locate the latter accurately with reference to the center of the table or board, and said plotting sheet is preferably provided with radial lines and said graduations indicating dimensions on a small scale and adapted when marked by the pencil of the tracing arm as the latter is swung around the center formed by the bearing pin 57 to accurately indicate the contour and dimensions of the inner surface of the wall of the boiler.

In order to accurately position the plotting table or board with its center in coincidence with the axis of the boiler, a supplemental tool indicated in Figures 17 and 18 may be used, the same consisting of a sector plate 69 upon which is mounted a triangle 70, said sector plate carrying a needle point 71. By placing the curved edge of the sector plate and the corresponding perpendicularly arranged edge of the triangle 70 in contact with the surface of the wall of the boiler, the needle point will indicate the adjustment of the plotting board or table necessary to secure the coincidence thereof with the axis of the boiler.

By the use of an apparatus such as described it will be understood that the task of determining accuracy of the contour and dimensions of the interior of a boiler is materially facilitated, and as the parts of the apparatus and particularly of the spider representing the supporting member, are readily detachable and may be readily reassembled, the introduction of the same into the boiler or through the furnace door, regardless of the dimension thereof, is made possible without involving material loss of time or effort upon the part of the operator.

What is claimed is:

1. A boiler diagramming device having a supporting member provided with radially adjustable arms for terminal contact with the inner surface of a boiler, a plotting table or board universally mounted upon said supporting member for angular adjustment with reference to the axis of the boiler, and a tracing arm revolubly mounted for movement around the center of said tracing board or table in terminal contact with the inner surface of the wall of the boiler and provided with a scribing point for traversing the surface of said plotting board or table.

2. A boiler diagramming apparatus having a supporting member provided with radially adjustable supporting arms, a plotting board or table universally mounted for angular movement relative to the axis of the supporting member and for movement in all directions in its own plane for disposing its center in coincidence with the axis of a boiler, and a tracing arm mounted for rotation concentric with and upon the center of the plotting table or board and provided with a terminal bearing for contact with the inner surface of the wall of a boiler and a scribing point for traversing the surface of said plotting board or table.

3. A boiler diagramming apparatus having a supporting member, a plotting board or table mounted thereon and a tracing arm mounted upon the table for terminal contact with the inner surface of the wall of a boiler, said supporting member having a base, arms extending radially from the base and consisting of telescoping elements of which the outer are provided with bearing points, and means for simultaneously adjusting the movable elements of said arms.

4. A boiler plotting apparatus having a supporting member, a plotting table or board supported thereon and a tracing arm mounted for rotation with reference to the center of said table or board, the supporting member having a base provided with radial studs, arms having telescoping elements connected respectively with said studs, the outer element being provided with bearing points, and a screw plate having engagement with racks on the adjustable elements of said arms for simultaneously advancing the same into bearing contact with the inner surface of the wall of the boiler.

5. A boiler diagramming apparatus having a supporting member, a plotting board or table mounted upon said member and a tracing arm mounted for rotation with reference to the center of said board or table, the supporting member consisting of a base, radial arms having telescoping elements respectively secured to the base and movable relative thereto, the movable elements being provided with racks, guides carried by the elements secured to said base, and an annular screw plate mounted in said guides and engaged with the racks of the movable elements for simultaneously advancing the latter for terminal contact with the inner surface of the wall of the boiler.

6. A boiler diagramming apparatus having a supporting member, consisting of a spider provided with radially adjustable arms, and a central annular base, a center post fitted in said base and provided with intersecting slots, a supporting plate having segments pivotally mounted thereon for swinging movement in directions at right angles to each other and seated respectively in said slots of the center post, a plotting table or board mounted upon the supporting plate, and universally adjustable therewith to assume a position in perpendicularity to the axis of the boiler, and a tracing arm mounted for rotation concentric with the plotting board or table and having a terminal bearing for contact with the inner surface of the boiler wall and a scribing point for traversing the surface of the plotting table or board.

7. A boiler plotting apparatus having a supporting member provided with means for centering the same in a boiler structure, a supporting plate mounted for universal angular movement with reference to the axis of the supporting member, a plotting table or board, and an intermediate plate disposed between said supporting plate and the plotting table or board and respectively movable in directions at right angles to each other and in parallel planes relative to the supporting plate, and a tracing arm mounted for rotation concentric with the plotting board or table and having a bearing terminal for contact with the inner surface of the wall of a boiler and a scribing point for traversing the surface of the plotting board or table.

8. A boiler diagramming apparatus having a supporting member provided with means for centering the same in a boiler structure, a supporting plate mounted for universal angular movement with reference to the axis of said supporting member and provided with parallel guides, an intermediate plate mounted upon said guides for adjustment parallel therewith and in a plane parallel with the supporting plate, means for securing said intermediate plate in its adjusted position with relation to the supporting plate, a plotting table or board mounted upon the intermediate plate for movement in a plane parallel therewith and in a direction at right angles to the direction of adjustment of said intermediate plate with reference to the supporting plate, means for securing said plotting plate or table in its adjusted position, and a tracing arm mounted for rotation concentric with the center of the plotting board or table and having a bearing terminal for contact with the inner surface of a boiler wall and a scribing point for traversing the plane of the plotting board or table.

9. A boiler diagramming apparatus having a supporting member provided with means for engaging the inner surface of the boiler and centering said member therein, a supporting plate mounted for universal angular adjustment with relation to the supporting member, means for securing said supporting plate in its adjusted position, a plotting board or table mounted upon the supporting plate for universal angular adjustment therewith and movable in opposite directions to secure coincidence of its center with the axis of a boiler, said plotting board or table being provided with a central thimble, a bearing pin removably engaged with said thimble, and a tracing arm mounted at its inner end upon said bearing pin and consisting of telescoping members of which the outer member is provided with a guide roller for contact with the surface of the wall of a boiler, a spring for maintaining said outer member in its extended position, and a yieldingly supported scribing point carried by the inner end of said movable outer member for traversing the surface of the plotting board or table.

10. A boiler diagramming apparatus having a supporting member provided with means for centering the same in a boiler structure, a supporting plate mounted for universal angular movement with reference to the supporting member and means for securing the same in its adjusted position, a plotting table or board mounted for sliding movement in opposite directions relative to the plane of the supporting plate to secure coincidence of its center with the axis of a boiler, means for securing said plotting board or plate in its adjusted position, a tracing arm mounted for rotation concentric with the center of the plotting board or table and having a bearing terminal for contact with the inner surface of the wall of a boiler and a scribing point for traversing the surface of said plotting board or table, and means for securing a plotting sheet to said plotting board or table in accurate concentricity therewith.

In testimony whereof I affix my signature.

RAMON GONZALEZ.